(12) United States Patent
Wolverton

(10) Patent No.: US 9,074,640 B1
(45) Date of Patent: Jul. 7, 2015

(54) SQUAWK REDUCING CLUTCH HUB ASSEMBLY

(71) Applicant: Ron Wolverton, Mary Esther, FL (US)

(72) Inventor: Ron Wolverton, Mary Esther, FL (US)

( * ) Notice: Subject to any disclaimer, the term of this patent is extended or adjusted under 35 U.S.C. 154(b) by 0 days.

(21) Appl. No.: 14/073,598

(22) Filed: Nov. 6, 2013

(51) Int. Cl.
*F16D 11/14* (2006.01)
*F16D 25/12* (2006.01)

(52) U.S. Cl.
CPC .............. *F16D 11/14* (2013.01); *F16D 25/123* (2013.01); *F16D 2300/22* (2013.01)

(58) Field of Classification Search
CPC combination set(s) only.
See application file for complete search history.

(56) References Cited

U.S. PATENT DOCUMENTS

| 7,163,095 B2 | 1/2007 | Springer et al. | |
|---|---|---|---|
| 7,478,709 B2* | 1/2009 | Haka et al. | 188/378 |
| 2012/0111692 A1 | 5/2012 | Chern et al. | |

* cited by examiner

*Primary Examiner* — Ramya Burgess
*Assistant Examiner* — Mark Manley
(74) *Attorney, Agent, or Firm* — Peter Loffler

(57) ABSTRACT

An E clutch hub assembly for the Ford 6R140 transmission, that reduces the squawk noise that occurs during the 3-4 upshift. A clutch hub has a lower pressure washer onto which is stacked a damper hub having radially located lube holes to direct lube to the E clutch plates. An upper pressure washer is stacked onto the damper hub while a pressure plate, seated within a snap ring rove machined into the hub, applies pressure onto the two pressure washers which help absorb the squawk noise. A waved spring holds the entire assembly within the hub.

5 Claims, 3 Drawing Sheets

SQUAWK REDUCING CLUTCH HUB ASSEMBLY

BACKGROUND OF THE INVENTION

1. Field of the Invention

The present invention relates to a clutch hub structure for a Ford 6R140 transmission, wherein the clutch hub helps absorb unwanted squawk during the 3-4 shift.

2. Background of the Prior Art

The 6R140 is a heavy duty transmission produced by Ford Motor Company of Dearborn Mich. The 6R140 is a six speed transmission, which through the changing of the torque converter, the dutch plates, the friction paper, and with shift schedule software calibrations, can be coupled to either Ford's 6.7 liter diesel engine that requires low end torque, or to Ford's 6.2 liter gas engine that has a higher revving peak power curve. The 6R140 is considered to be a technological marvel and has found great market success.

One of the key problems associated with the 6R140 is that the transmission puts out substantial squawk of the oncoming 4th gear clutch during the 3-4 up shift. Transmission squawk is caused by the self-excitation of the oncoming clutch of the new speed ratio. Despite the ATF additives and the friction compound being used for the E-clutch, the 3-4 shift squawk of the 68140 remains a problem and is a source of complains among many 6R140 transmission owners, even more so if the aftermarket clutches are installed with the goal being to upgrade this E clutch pack with a stronger more durable clutch material.

What is needed is a solution to the 3-4 shift transmission squawk of the 6R140 transmission. Such a solution must be relatively straightforward so that it can be implemented into existing transmissions, with or without aftermarket clutches, and without undue costs. Such a solution must not add undue mass to the overall transmission assembly nor introduce undue friction so as to rob the drive assembly of power.

SUMMARY OF THE INVENTION

The squawk reducing clutch hub assembly of the present invention addresses the aforementioned needs in the art by reducing the transmission squawk of the $4^{th}$ gear clutch during the 3-4 upshift of the 6R140 transmission. The squawk reducing clutch hub assembly is a relatively straightforward solution that can be implemented into existing transmissions, with or without aftermarket clutches, and is implemented without undue complexity or costs. The squawk reducing clutch hub assembly does not add substantial mass to the overall transmission assembly nor does the squawk reducing clutch hub assembly require the sacrifice of substantial horsepower from the drive assembly.

My testing of the 6R140 transmission has shown that the weakest link within the transmission is the E clutch pack, this being the $4^{th}$ gear clutch pack. This gear change clutch pack is also the clutch pack that makes the squawk noise. To increase the holding capacity of this clutch, I had to change the surface area and the friction compounds. I quickly learned that a better friction with a better coefficient material increases the squawk noise. The bell design of the E clutch hub amplifies the clutch noise with the more aggressive frictions. After trying many friction compound and groove patterns to try and stop the squawk noise, I determined that a damper assembly would be required. The damper assembly is contained inside the E clutch hub and does not require any modifications to other parts to be used within the transmission and is effective in reducing the clutch squawk during the 3-4 up shift. In addition to reducing the squawk, I designed the damper system with a groove on the inside diameter of the damper hub to catch the lube oil and I have added several holes or lube openings, cross drilled (radially along the damper hub) on the damper hub to guide the lube oil up and to the outer diameter of the clutch hub, which also is grooved to help retain the oil while it exits through another set of holes on the clutch hub, the oil cooling and lubing the clutch plates.

The squawk reducing clutch hub assembly is comprised of an E clutch hub, which is a 6R140 E clutch hub, the E clutch hub having an interior with a bottom and a top, such that an inwardly directed annular lip encircles the top and a snap ring groove is disposed (machined thereinto) within an inner surface wall of the E clutch hub below the annular lip. A lower damper thrust washer is disposed within the interior of the hub and seated on the bottom. A damper hub is seated atop the lower damper thrust washer. An upper damper thrust washer is seated atop the damper hub. A damper pressure plate having an open annular groove is seated atop the upper damper thrust washer and is also seated within the snap ring groove inside the E clutch hub. A damper waved spring is seated within the open annular groove of the damper pressure plate and is biased against the annular lip, thereby placing pressure onto the damper pressure plate, which helps create drag on both the upper damper thrust washer and the lower damper thrust washer during the 3-4 up shift, thereby helping reduce the squawk that otherwise occurs during this shift. The damper hub has a series of radially disposed lubrication openings. The damper pressure plate has a series of teeth located along an outer periphery, the teeth engaging the inner surface wall of the E clutch hub.

BRIEF DESCRIPTION OF THE DRAWINGS

Similar reference numerals refer to similar parts throughout the several views of the drawings.

DESCRIPTION OF THE PREFERRED EMBODIMENT

Figure 1:
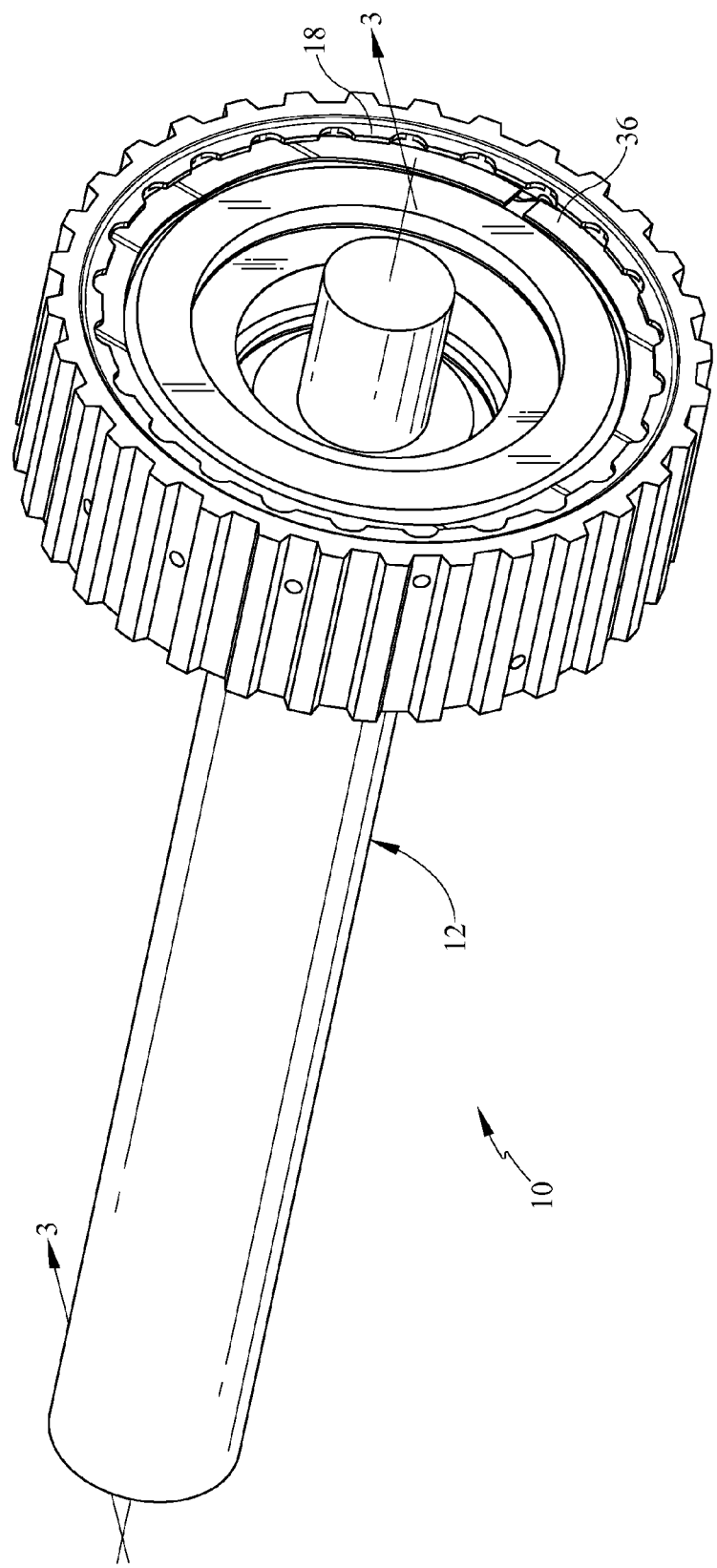
FIG. 1 is a perspective view of the 6R140 clutch hub assembly of the present invention.
Figure 2:
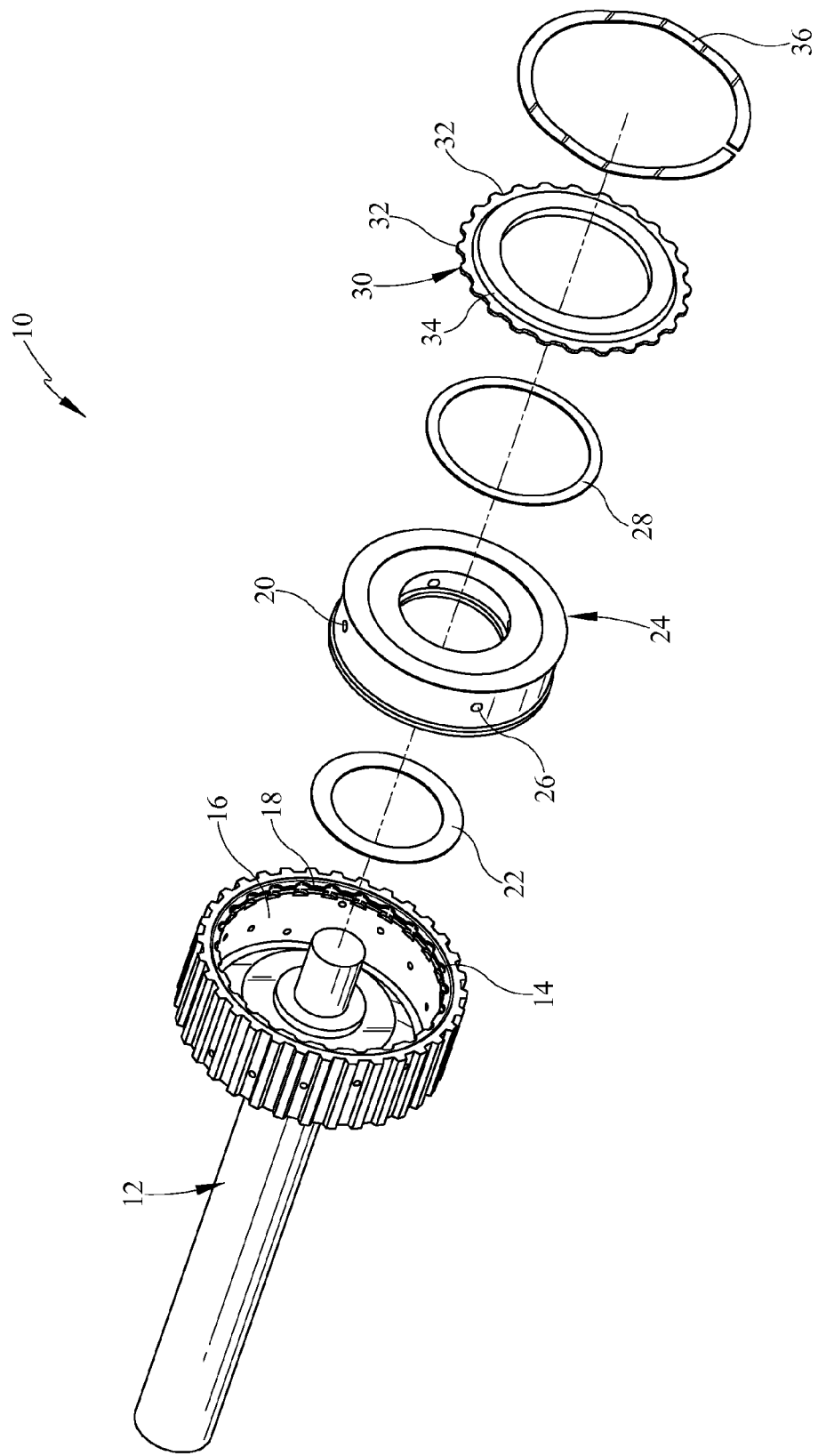
FIG. 2 is an exploded view of the 6R140 clutch hub assembly.
Figure 3:
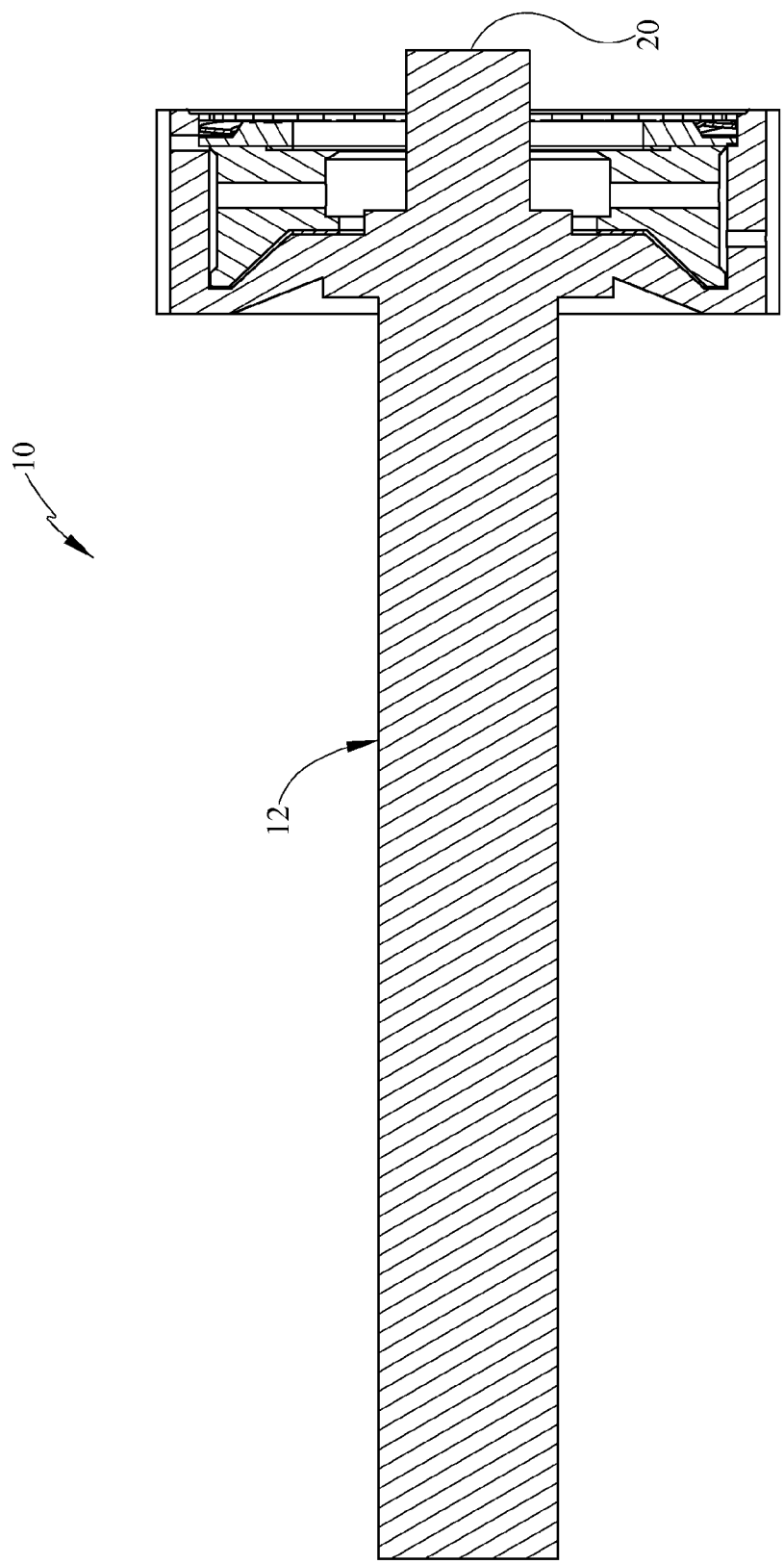
FIG. 3 is a sectioned view of the 6R140 clutch hub assembly taken along line 3-3 in FIG. 1.

Referring now to the drawings, it is seen that the squawk reducing clutch hub assembly of the present invention, generally denoted by reference numeral 10, is comprised of a an OEM part, E clutch hub 12, also referred to as a overdrive clutch hub for the 6R140 transmission produced by Ford Motor Company of Dearborn, Mich. The E clutch hub 12 has been modified by providing a snap ring groove 14 within an inner wall 16 of E clutch hub 12 just below an inwardly directed upper annular lip 18.

Stacked within the interior of the E clutch hub 12 and encircling the upper portion of its shaft 20 is a lower damper thrust washer 22. The lower thrust damper washer 22 acts like a washer as well as a friction surface which creates some drag during the 3-4 up shift. This drag is determined by the coefficient of the friction material used to produce the lower thrust damper washer 22, the amount of pressure applied to the friction surface of the lower thrust damper washer 22, and the amount of surface area onto which this pressure is applied. The drag created by the lower thrust damper washer 22 helps absorbs the squawk that occurs during the 3-4 up shift. Stacked on top of the lower thrust damper washer 22 is a modified damper hub 24 that has a series of radially positioned lube openings 26. The lube openings 26 direct lube to the E clutch plates (not illustrated) which help reduce self-excitation of the E clutch plates when not applied and cools the E clutch pack while applied. The damper hub 24 is made from heavy steel which allows it to rotate momentarily while the E clutch hub 12 stops on the E clutch apply, helping absorb the clutch squawk. The mass weight of the damper hub 24 coupled with the friction drag and spring pressure, as discussed more fully below, helps suppress the squawk noise commonly heard on the 3-4 shifting clutch. Stacked on top of the damper hub 24 is an upper damper thrust washer 28. The upper damper washer 28, like the lower thrust damper washer 22, acts like a washer as well as a friction surface which creates some drag. This drag is also determined by the coefficient of the friction material used for the upper thrust damper washer 28, the amount of pressure applied to the friction surface of the upper thrust damper washer 28, and the amount of surface area onto which the pressure is applied. The drag created by the upper thrust damper washer 28 also helps absorbs the squawk that occurs the during the 3-4 up shift. Stacked on top of the upper damper thrust washer 28 is a damper pressure plate 30 that has a series of teeth 32 on its outer periphery. The teeth 32 engage the inner wall 16 of the E clutch hub 12 when the damper pressure plate 30 is seated within the groove 14. As seen, the upper surface of the damper pressure plate 30 has an open groove 34 machined there into. A damper waved spring 36 seats within the open groove 34 of the top of the damper pressure plate 30 as well as within the snap ring groove 14 of the E clutch hub 12 and applies pressure onto the damper pressure plate 30 by biasing against the annular lip 18 of the E clutch hub 12. The damper pressure plate 30 places pressure onto the upper thrust damper washer 28 and the lower thrust damper washer 22 in order to help create the squawk reducing drag of these washers 22 and 28.

While the invention has been particularly shown and described with reference to an embodiment thereof, it will be appreciated by those skilled in the art that various changes in form and detail may be made without departing from the spirit and scope of the invention.

I claim:

1. A hub assembly comprising:
   a clutch hub having an interior with a bottom and a top, such that an inwardly directed first annular lip encircles the top and a snap ring groove is disposed within an inner surface wall of the clutch hub below the first annular lip;
   a non-slotted lower damper thrust washer disposed within the interior of the hub and seated on the bottom;
   a damper hub seated on the lower damper thrust washer, the damper hub being a cylindrical member having a central opening, an inner surface facing the central opening, an opposing outer surface, a top surface and a bottom surface such that a second annular lip encircles the top surface and is inwardly directed partially into the central opening and a third annular lip encircles the bottom surface and is inwardly directed partially into the central opening and such that a series of radially disposed openings are disposed within the damper hub and extend between the inner surface and the outer surface and allow fluid to flow therethrough;
   a non-slotted upper damper thrust washer seated on the damper hub;
   a damper pressure plate having an open annular groove, the damper pressure plate seated on the upper damper thrust washer and seated within the snap ring groove; and
   a damper waved spring seated within the open annular groove of the damper pressure plate and biasing against the annular lip thereby placing pressure onto the damper pressure plate.

2. The hub assembly has in claim 1 wherein the damper pressure plate has a series of teeth located along an outer periphery, the teeth engaging the inner surface wall of the clutch hub.

3. The hub assembly as in claim 2 wherein the clutch hub is a 6R140 clutch hub.

4. The hub assembly has in claim 1 wherein the damper pressure plate has a series of teeth located along an outer periphery, the teeth engaging the inner surface wall of the clutch hub.

5. The hub assembly as in claim 1 wherein the clutch hub is a 6R140 clutch hub.

\* \* \* \* \*